(No Model.)
R. I. DRAUGHON.
Cotton Chopper.
No. 237,502.   Patented Feb. 8, 1881.
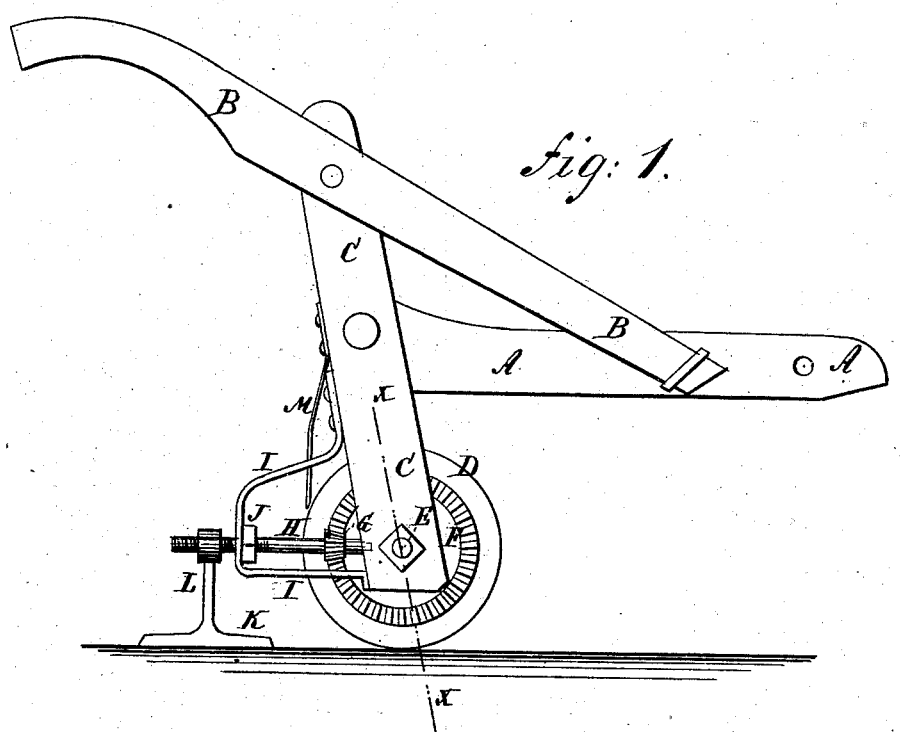
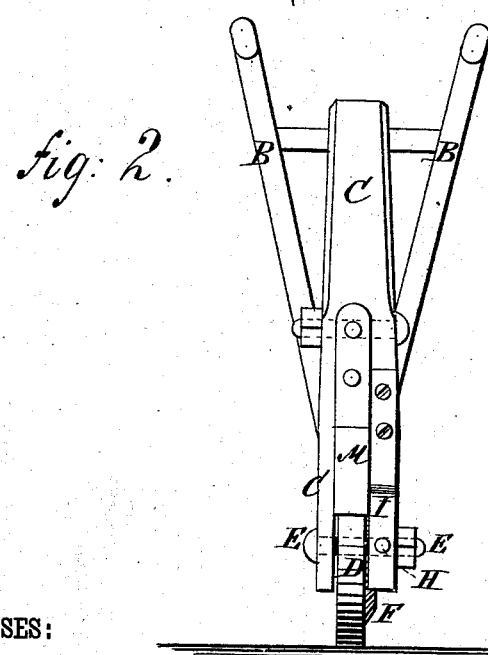
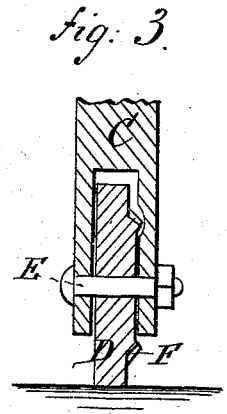
WITNESSES:
A. Schehl.
C. Sedgwick
INVENTOR:
R. I. Draughon
BY Munn & Co
ATTORNEYS.

UNITED STATES PATENT OFFICE.

ROBERT I. DRAUGHON, OF PERDUE HILL, ASSIGNOR TO HIMSELF AND R. CUNNINGHAM, OF CLAIBORNE, ALABAMA.

COTTON-CHOPPER.

SPECIFICATION forming part of Letters Patent No. 237,502, dated February 8, 1881.

Application filed November 9, 1880. (No model.)

*To all whom it may concern:*

Be it known that I, ROBERT I. DRAUGHON, of Perdue Hill, in the county of Monroe and State of Alabama, have invented a new and useful Improvement in Cotton-Choppers, of which the following is a specification.

Figure 1 is a side elevation of the improvement. Fig. 2 is a rear elevation. Fig. 3 is a sectional elevation taken through the line $x$ $x$, Fig. 1.

Similar letters of reference indicate corresponding parts.

The object of this invention is to furnish cotton-choppers so constructed as to be easily guided along a row of plants, whether straight or crooked, and around stumps or other obstructions, which will chop the plants to a stand without throwing the soil out of place, and which will allow the horse to walk at the side of the row.

In the accompanying drawings, A represents the beam, B the handles, and C the standard, of an ordinary plow-stock. The lower part of the standard C is slotted longitudinally to receive the wheel D, the journals E of which work in bearings in the lower part of the slotted standard C.

If desired, the journal E may be attached to the standard C and the wheel D arranged to revolve upon it. The face of the wheel D may be roughened, or may have teeth formed upon it, or spikes attached to it, to prevent the wheel from slipping upon the ground.

If desired, the slotted lower part of the standard C may be made in two parts bolted to each other, for convenience in putting in the wheel D and journal E.

To one side of the wheel D is attached, or upon it is formed, a beveled-gear wheel, F, of a less diameter than the said wheel D, and into the teeth of which mesh the teeth of a small beveled-gear wheel, G, attached to the shaft H. The forward end of the shaft H revolves in bearings formed in or attached to the standard C, and its rear part revolves in bearings in a curved bar or bracket, I, the ends of which are attached to the standard C. The bar or bracket I may be made in one piece, or it may be made in two pieces, the adjacent ends of which overlap and are bolted to each other, and have several holes formed through them to receive the fastening bolts or screws, so that they can be adjusted to raise or lower the chopping-hoe to cause it to work shallower or deeper in the ground, as may be desired. The shaft H can be held from longitudinal movement in the bracket I by one or more nuts, J, screwed upon it, or by other suitable means, so that it can be conveniently moved longitudinally to throw the gear-wheel G out of gear with the gear-wheel F when the chopper is to be moved from place to place and it is not desired to have the chopping-hoe operate; or the gear-wheel G may be placed upon a square part of the shaft H, or connected with the said shaft by a groove and a tongue or key, and secured in place by a set-screw or other suitable means, so that the chopper can be thrown out of and into gear by adjusting the said gear-wheels.

K is the chopping-hoe, the shank L of which has a square eye formed through it to receive a square part of the shaft H, so that the said chopping-hoe will be carried around by and with the said shaft H in its revolution. The shank L is secured in place upon the shaft H by nuts or other suitable means. The hoe K is bent forward at one corner, or twisted so that it will enter and pass through the soil in such a direction as not to throw or move the said soil from its place, and is made of such a width as to equal the length of the space to be left between the hills when the plants have been chopped to a stand.

The relative sizes of the gear-wheels F G should be so arranged as to leave the desired quantity of plants between the cuts for a stand.

If desired, more than one hoe K L may be attached to the shaft H, the relative sizes of the gear-wheels F G being arranged accordingly.

M is a metal plate, the upper end of which is attached to the standard C, and its lower end projects downward into such a position as to scrape off any soil that may adhere to the wheel D, and which, unless removed, might interfere with its proper operation.

I am aware that it is not new to rotate a chopper-shaft by a pinion working in side spurs on a ground-wheel; but

What I claim is—

The ground-wheel D, rotating in a slot of the standard C, and connected by gear F G with a chopper-shaft journaled in the standard-bracket I, as shown and described.

ROBT. ISAAC DRAUGHON.

Witnesses:
H. I. SAVAGE,
C. B. SAVAGE.